INVENTORS
Oliver K. Kelley
Gilbert K. House
Clifford C. Wrigley
BY Craig V. Morton
Their Attorney Aug. 19, 1958
O. K. KELLEY ET AL
2,847,978
WINDSHIELD WIPER ACTUATING MECHANISM
Filed Feb. 9, 1955
4 Sheets-Sheet 3
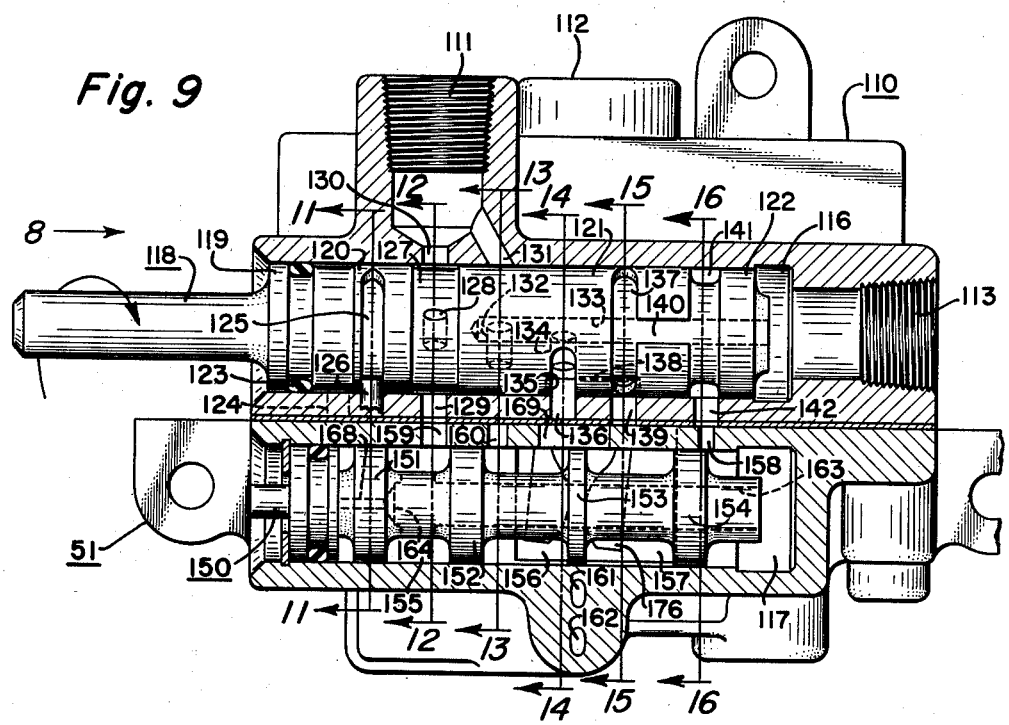
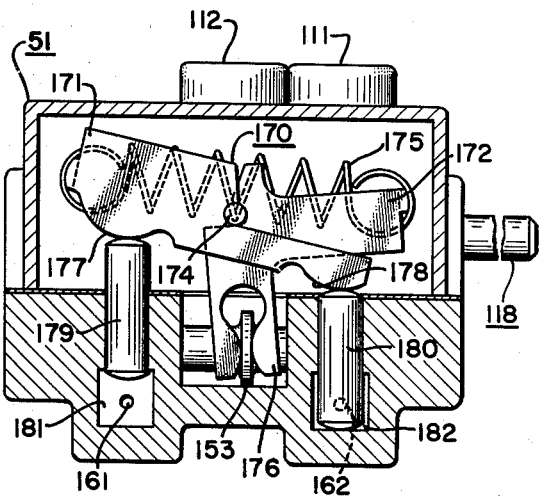
INVENTORS
Oliver K. Kelley
Gilbert K. House
BY Clifford C. Wrigley
Craig V. Morton
Their Attorney Aug. 19, 1958  O. K. KELLEY ET AL  2,847,978
WINDSHIELD WIPER ACTUATING MECHANISM
Filed Feb. 9, 1955  4 Sheets-Sheet 4

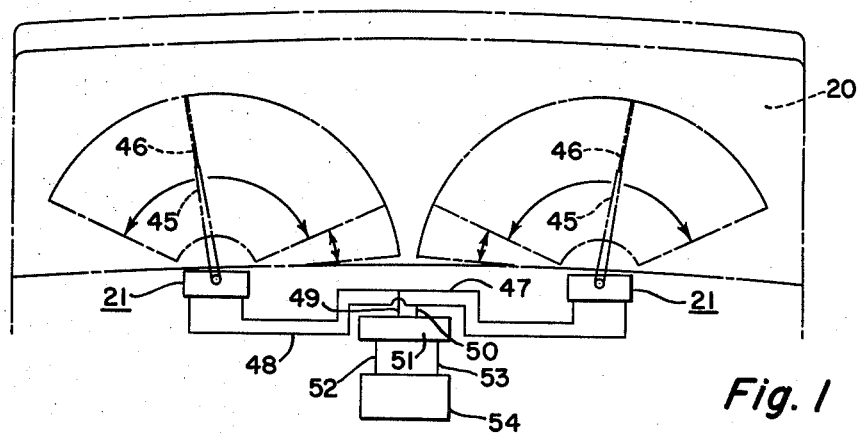
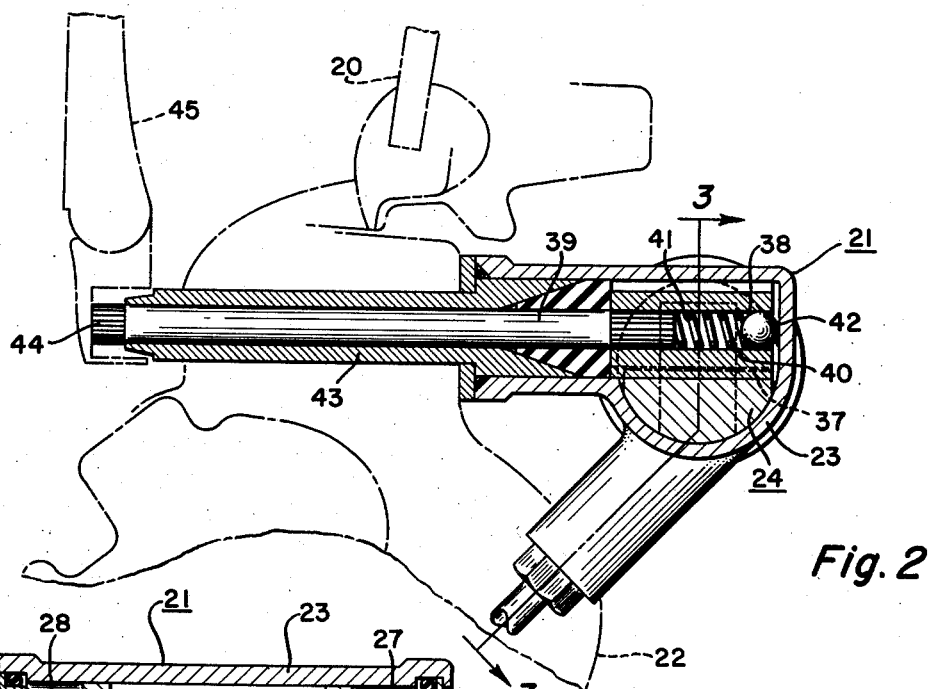
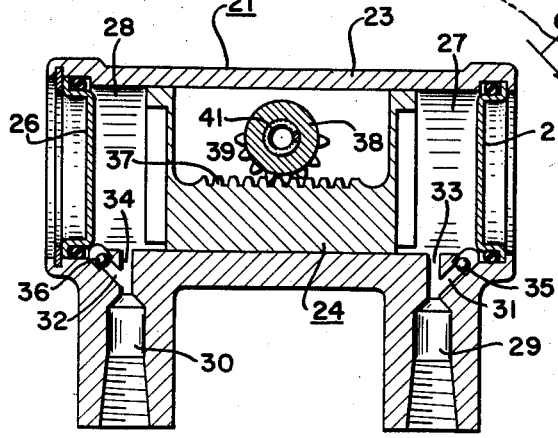

INVENTORS
Oliver K. Kelley
BY Gilbert K. Hause
Clifford C. Wrigley

Craig V. Morton
Their Attorney

United States Patent Office 2,847,978
Patented Aug. 19, 1958

2,847,978

WINDSHIELD WIPER ACTUATING MECHANISM

Oliver K. Kelley, Birmingham, Gilbert K. Hause, Franklin, and Clifford C. Wrigley, Grosse Pointe Woods, Mich., assignors to General Motors Corporation, Detroit, Mich., a corporation of Delaware Application February 9, 1955, Serial No. 487,196

16 Claims. (Cl. 121—158)

This invention pertains to fluid motors, and particularly to fluid motors designed for actuating vehicle windshield wipers.

Modern vehicles are equipped with a pair of windshield wipers, which are usually actuated by a single, centrally located motor through a transmission unit. The transmission units are objectionable for many reasons, such as: noise of operation; excessive free play; loss of tension in cables; and difficulty in maintaining synchronous movement of the blades. In this invention, each wiper blade is drivingly connected to an independent fluid motor, and a single control valve unit is utilized to control and effect synchronous operation of the motors. Accordingly, among our objects are the provision of windshield wiper actuating mechanism including independent fluid motors for each cleaner assembly; the further provision of a unitary control valve assembly for controlling and effecting synchronous operation of a plurality of fluid motors; and the still further provision of actuating mechanism of the aforesaid character wherein malfunctioning, or stalling, of one motor will not affect operation of the other motor.

The aforementioned and other objects are accomplished in the present invention by incorporating pressure responsive, snap acting reversing valve means for controlling the simultaneous application of pressure fluid to both motors. Specifically, each motor comprises a cylinder having disposed therein a two-headed reciprocable piston capable of fluid pressure actuation in both directions. The stroke of the motor piston may be extended in either direction for parking purposes, and the piston includes a rack which meshes with a sector gear attached to an oscillatable output shaft. The piston divides the cylinder into two chambers, each of which is connected to a port through a check-valved passage that is bypassed by a calibrated orifice.

Two types of control valve units are disclosed herein, both of which are pressure responsive. In one control valve unit embodiment, the reversing means comprise a toggle spring loaded spool valve that controls the application of pressure fluid to both motors. Each end of the spool valve has operatively associated therewith a reaction piston, which senses the pressure applied to one chamber of the motors. When this pressure increases due to the motor pistons approaching their normal stroke ends thereby closing the calibrated orifice, one reaction piston is forced against a pair of springs. One of the springs exerts pressure directly against the spool valve, and when this spring pressure exceeds a predetermined value, the toggle spring will snap and reverse the position of the spool valve. The valve unit also includes a manually positionable valve element for controlling motor speed, washer pump operation, and for disabling one of the reaction pistons whereby the stroke of the motors will be extended and motor movement will be arrested in a parked position.

In another control valve embodiment, reversing means comprises a spool valve which is loaded by a spring toggle. The toggle is operatively associated with a pair of reaction pistons, each of which is responsive to the pressure fluid applied to one of the motor chambers. When the pressure increases due to the approach of the pistons to their normal stroke ends, one of the reaction pistons pushes the toggle mechanism over its center position whereby the spool valve will be snapped to its other position thereby reversing motor movement. Speed, washer, and parking control are effected by a manually positionable valve element.

Further objects and advantages of the present invention will be apparent from the following description, reference being had to the accompanying drawings wherein preferred embodiments of the present invention are clearly shown, and wherein similar reference characters denote similar parts throughout the several views.

In the drawings:

Fig. 1 is a diagrammatic view illustrating the windshield wiping mechanism of this invention.

Fig. 2 is a fragmentary view, partly in section and partly in elevation, of a wiper motor, and illustrating the manner in which it is mounted in a vehicle.

Fig. 3 is a sectional view taken along line 3—3 of Fig. 2.

Figure 4:
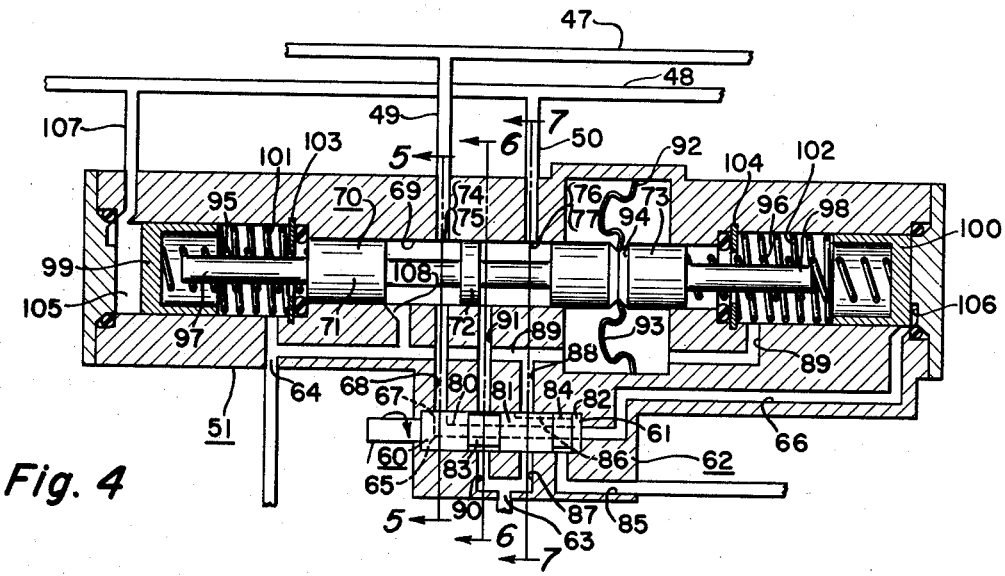
Fig. 4 is a composite diagrammatic and sectional view of one form of control valve unit.
Figure 5:
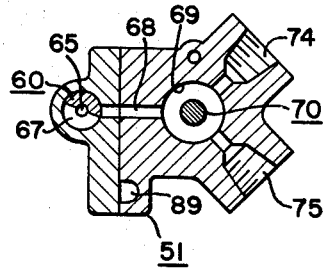
Figure 6:
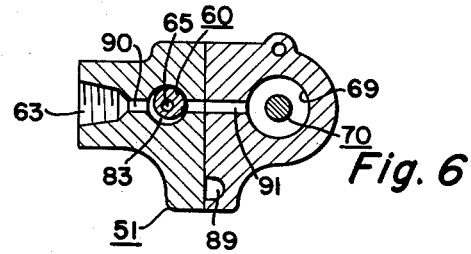
Figure 7:
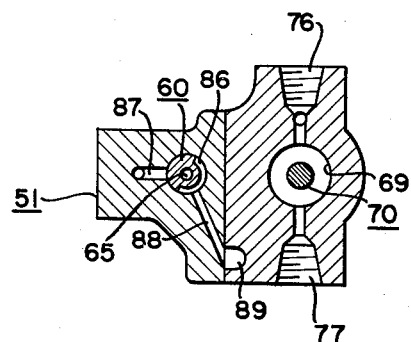

Figs. 5, 6 and 7 are sectional views taken along lines 5—5, 6—6, and 7—7, respectively, of Fig. 4.

Fig. 8 is a view, in elevation, of another form of control valve unit taken in the direction of arrow 8 in Fig. 9.

Figs. 9 and 10 are sectional views taken along lines 9—9 and 10—10, respectively, of Fig. 8.

Figs. 11 through 16 are sectional views taken along lines 11—11, 12—12, 13—13, 14—14, 15—15 and 16—16, respectively, of Fig. 9.

Figure 15:
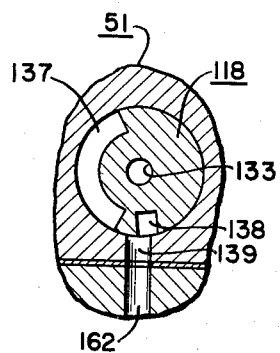
Figure 16:
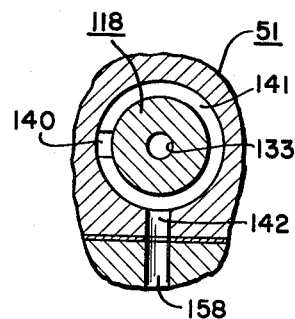
Figure 17:
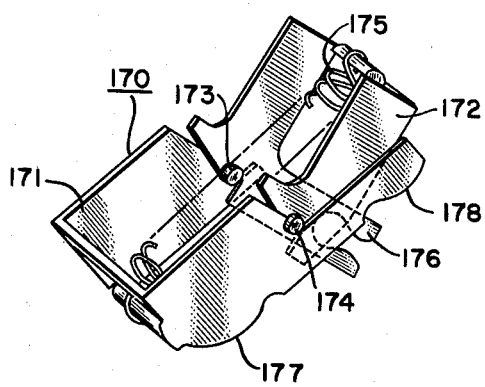

Fig. 17 is a view, in perspective, of the toggle mechanism of the valve unit depicted in Figs. 8 through 16.

With particular reference to Fig. 1, a vehicle windshield is depicted by the numeral 20. In accordance with conventional practice, the vehicle windshield includes a pair of cleaner assemblies disposed on opposite sides of the medial portion of the windshield, and arranged for asymmetrical operation. Inasmuch as each cleaner assembly is identical, only one will be described, like parts of the other being indicated by like numerals.

Each cleaner assembly comprises a fluid motor 21 which, as shown in Fig. 2, is mounted on the passenger side of the vehicle firewall, which is generally designated by the numeral 22. As seen in Figs. 2 and 3, the motor unit 21 comprises a cylinder 23 having disposed therein a two-headed reciprocable piston 24 capable of fluid pressure actuation in both directions. The ends of the cylinder 23 are closed by cap members 25 and 26, and the piston 24 divides the cylinder into two chambers 27 and 28. Chamber 27 connects with a pressure port 29 through a check-valved passage 31, which is bypassed by a calibrated orifice 33. The check valve passage 31 has disposed therein a ball 35, which permits flow from the port 29 to the chamber 27 but substantially prevents flow in the reverse direction.

In a similar manner, the chamber 28 connects with a port 30 through a check valve passage 32, which is bypassed by a calibrated orifice 34. The passage 32, likewise, includes a ball check valve 36. The intermediate portion of the piston 24 is formed as a rack 37, which meshes with a sector gear 38. The sector gear 38 is connected to an output shaft 39. As seen in Fig. 2, the sector gear 38 includes a centrally recessed portion 40 within which a spring 41 is disposed. The spring urges a ball 42 into engagement with the cylinder 23, which ball constitutes a bearing support for the sector gear 38 and the shaft 39. In a conventional manner, the shaft 39 is enclosed by a bushing 43, which extends through the cowl portion of the vehicle. The other end of the shaft 39 is formed with the usual serrated burr 44 to which a wiper arm 45 is detachably connected. The free end of the wiper arm is connected to a suitable wiper blade 46.

As is seen diagrammatically in Fig. 1, the control ports of the motor are interconnected by conduits 47 and 48. More particularly, the inboard chambers of the two motor units 21 are connected by conduit 47, while the outboard chambers are connected by a conduit 48. In this manner, it will be appreciated that the blades 46 will move in opposite directions as is customary in present day vehicles. Conduits 47 and 48 are connected by conduits 49 and 50, respectively, to a control valve unit 51, which is connected by a pressure line 52 and a drain line 53 to a source of fluid under pressure 54. Preferably, the actuating mechanism of this invention is operated by suitable liquid medium, such as oil.

With particular reference to Figs. 4 through 7, one form of control valve unit, which is generally designated by the numeral 51 in Fig. 1, is disclosed. The preferred embodiment of the control valve unit is disclosed in Figs. 8 through 17. Both control valve units operate on a similar principle in that the reversing valve mechanism is of the snap acting type, and the triggering mechanism therefor is controlled by the pressure build up, which is caused by the approach of the motor pistons towards the ends of their normal wiping strokes, thereby closing the calibrated orifices.

As disclosed in Figs. 4 through 7, the control valve unit 51 may include a manually positionable valve element 60 of the rotary type. The valve element 60 is disposed within a bore 61 of a housing or valve casing 62. The housing includes a pressure supply port 63 and a drain port 64. The valve element 60 is formed with a centrally disposed passage 65, one end of which communicates with a passage 66 of the housing 62. The other end of the passage 65 communicates with an arcuate groove 67, which subtends an angle of substantially 180°, as seen in Fig. 5. The valve element 60 may be positioned so that the arcuate groove 67 communicates with a passage 68 that connects with a housing bore 69 within which the reversing valve means is disposed. The reversing valve means comprise a spool valve 70, having axially spaced lands 71 and 72, which are separated by an annular groove and a toggle actuating portion 73, which is separated by an annular groove from the land 72. The annular groove between lands 71 and 72 communicates with a pair of ports 74 and 75, which connect with conduits 47 and 49. The annular groove between lands 72 and the toggle portion 73 communicates with a pair of ports 76 and 77, which connect with conduits 48 and 50.

The control valve element 60 also includes spaced lands 80, 81 and 82. Lands 80 and 81 are separated by an eccentric annular groove 83, while lands 81 and 82 are separated by annular groove 84. One side of annular groove 84 connects with a washer pump control passage 85. The washer pump may be of the type disclosed in our copending application, Serial No. 487,197, filed of even date herewith. The annular groove 84 also connects with an arcuate groove 86, which may be positioned to connect with a passage 87 that connects with the pressure supply port 63. Ordinarily, the arcuate groove 86 connects with a passage 88 that connects with a drain passage 89 and the drain port 64. The eccentric annular groove 83 is connected by passage 90 to the pressure supply port 63. The eccentricity of the annular groove functions as a throttling surface whereby the speed of motor operation may be controlled. Thus, the eccentric annular groove 83 communicates with a housing passage 91, which connects with the housing bore 69.

The mechanism for effecting snap action of the spool valve 70 comprises a pair of conventional toggle springs 92 and 93, the inner ends of which are received in a V-shaped groove 94 in the valve spool. The toggle springs 92 and 93 may be of conventional design. As shown in the drawing, the spool valve 70 is in its extreme left-hand position. As shown in Fig. 4, the spool valve 70 includes extending rod portions 97 and 98, respectively, which function as spring guides and stops. The rod 97 is encompassed by a spring 95, opposite ends of which seat against the land 71 and a reaction piston 99. Similarly, a spring 96 encompasses the rod 98, opposite ends of the spring abutting the toggle portion 73 and a reaction piston 100. The reaction piston 99 is also urged to the left by a spring 101, opposite ends of which engages the reaction piston and a snap ring 103. The reaction piston is disposed within a servo chamber 105, which connects through a conduit 107 with the conduit 48. Similarly, the reaction piston 100 is urged outwardly by a second spring 102, opposite ends of which engage the reaction piston 100 and a snap ring 104. The reaction piston 100 is disposed within a servo chamber 106, which is connected to the passage 66, which communicates with line 47 through line 49 and passage 68, and passage 65. The spool valve bore 69 may also be connected to passage 108 and the toggle spring chamber to the drain passage 89. In addition, the drain passage 89 connects with the spring chambers of both reaction pistons.

Operation of the reversing valve mechanism comprising the reaction pistons 99 and 100, the spool valve 70 and the toggle mechanism therefor, is as follows. As depicted in Fig. 4, pressure fluid entering port 63 traverses passage 90 and the throttle surface of the eccentric annular groove 83 from whence it passes through passage 91 to the bore 69. Inasmuch as the annular groove between land 72 and the toggle portion 73 is connected to the passage 91, pressure fluid will be applied to ports 76 and 77 to the conduits 50 and 48, while conduits 47 and 49 are connected to drain through the annular groove between lands 70 and 72, the passages 108, 89 and port 64. Inasmuch as servo chamber 105 is connected through passage 107 with the conduit 48, the pressure applied to the motors will, likewise, be applied to the servo chamber 105. Similarly, the other chambers of the motors and the servo chamber 106 are connected to drain. When the pressure builds up due to either resistance of the wiper blades, or due to the motor pistons approaching the ends of their wiping strokes thereby closing the inboard calibrated orifices in the motor cylinders, the reaction piston 99 will move to the right, as viewed in Fig. 4, thereby compressing springs 95 and 101. As soon as the pressure of spring 95 overcomes the toggle springs 92 and 93, the servo valves 70 will move with a snap action to the right whereupon passage 91 will communicate with the annular grooves between lands 70 and 72 and the annular groove between lands 72 and the toggle portion 73 will be connected to the drain conduit 89. In this manner, the motor pistons will be maintained in a state of continuous reciprocation during windshield wiper operation. Furthermore, by reason of the unitary valve assembly, synchronous operation of the wiper motors is assured. Speed control is afforded by the eccentric annular groove 83. Washer operation may be effected by rotating the valve 60 so that the groove 86 communicates with the passage 87.

To park the wiper motors and blades, the control valve is rotated to the position depicted in Fig. 5 wherein the passage 68 is blocked from the passage 65. Consequently, the servo chamber 106 is disconnected from the pressure and, therefore, the reaction piston 100 will be unable to overcome the toggle springs 92 and 93. Thus, the motor pistons will move both their normal stroke ends and into engagement with the end caps of the cylinders so as to position the blades in a parked position. It should be noted that pressure fluid is continuously supplied to one chamber of the motors so as to maintain the blades in the parked position at all times. Furthermore, it should be noted that the relationship of the eccentric groove 83 and the arcuate groove 86 is such that when the washer pump is actuated, the wiper motors operate at an intermediate speed due to throttling of the pressure fluid between passages 90 and 91.

Figure 11:
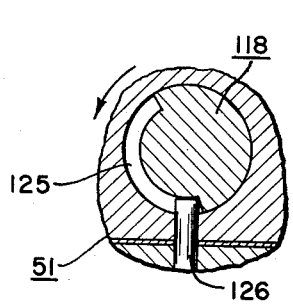

With particular reference to Figs. 8 through 17, the preferred embodiment of the control valve unit 51 will be described. The control valve unit depicted in Figs. 8 through 17 includes a valve housing 110 having a pressure inlet port 111, a drain port 112, a washer pump port 113 and motor control ports 114 and 115. The housing 110 includes a pair of spaced parallel bores 116 and 117. A manually positionable rotary valve element 118 is rotatably supported within the bore 116. The rotary valve 118 is formed with axially spaced lands 119, 120, 121 and 122. The annular groove between lands 119 and 120 has situated therein a rubber O-ring 123, and this annular groove is also connected to a passage 124, which communicates with the drain port 112. In this manner, any fluid which seeps past the land 120 will flow to drain. The land 120 is formed with an arcuate groove 125, as shown in Fig. 11. The groove 125 subtends an arc of substantially 165° and receives the end of a stop pin 126. The rotary valve 118 may be rotated in a counterclockwise direction, as viewed in Fig. 11, the position of the valve element in Fig. 11 denoting the "off" position. The valve element 118 may be rotated counterclockwise throughout approximately an angle of 135°, as will be pointed out more particularly hereinafter.

Figure 12:
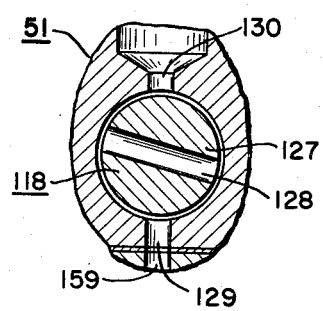

The reduced diameter portion 127 of the valve 118 between lands 120 and 121 is formed with a diametral passage 128, as viewed in Fig. 12. This portion 127 constitutes throttle means for controlling the rate of fluid flow from the pressure passage 130 to passage 129. When the valve element 118 is rotated counterclockwise to a position wherein the passage 128 is aligned with the passage 130 and the passage 129, it will be appreciated that the portion 127 will offer very little resistance to the flow of fluid. However, in all other positions, the flow will be restricted.

Figure 13:
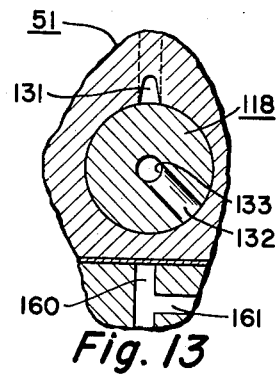
Figure 14:
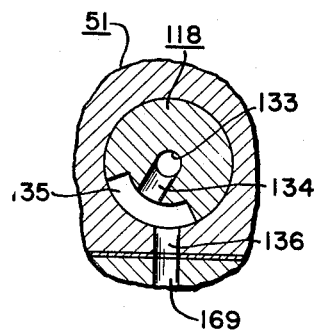

The pressure port 111 also connects with a passage 131, which may be aligned with a radial passage 132 of the valve 118, as shown in Fig. 13. The radial passage 132 connects with a centrally disposed axial passage 133 formed in the valve element 118. This passage 133 communicates with the washer pump control port 113. Thus, when the rotary valve 118 is rotated counterclockwise throughout an angle of at least 105°, the passages 131 and 132 will be in communication. The axial passage 133 also connects with a second radial passage 134, which communicates with an arcuate groove 135, as shown in Fig. 14. The arcuate groove 135, in turn, communicates with a drain passage 136 that connects with the drain port 112. Thus, it will be appreciated that when the rotary valve element 118 is in a position between the "off" position, as shown in Figs. 11 through 14, and an "on" position wherein it is rotated in a counterclockwise direction throughout an angle of less than 105°, the passage 133 will be connected to drain while the passage 131 will be blocked. However, between the angular positions of the valve element 118, in excess of 105° and up to 135°, the passages 131, 132, and 133 will be connected while the groove 135 and passage 134 will be disconnected from the drain passage 136. Thus, between the 105° and 138° positions of the valve 118, the washer and wiper will be cojointly operated.

The land 121 is formed with a second arcuate groove 137, which subtends an arc of substantially 150°. This portion of the land 121 is also formed with a longitudinally extending slot 138 which, in the "off" position of the valve element 118, connects a passage 139 with the groove 135 and the drain passage 136. However, as soon as the rotary valve 118 is moved to the "on" position, the passage 139 connects with the arcuate groove 137, which, as depicted in Figs. 9 and 16, connects through a longitudinal slot 140 with the annular groove 141, which is situated between lands 121 and 122. The annular groove 141 also communicates with a passage 142.

The reversing valve means of the control valve unit, depicted in Figs. 8 through 17, comprises a spool valve 150, which is supported for reciprocable movement within the bore 117. The spool valve 150 includes spaced lands 151, 152, 153 and 154, which are separated by annular grooves 155, 156 and 157. The passage 142 communicates with a control port 158, while the passage 129 communicates with a pressure port 159. In addition, the bore 117 is formed with a second control port 160, and a drain port 169 which connects with drain passage 136. Control port 158 is connected by suitable passage means, not shown, with the motor port 114, while control port 160 is connected by suitable passage means, not shown, with the motor control port 115. In addition, the port 160 is connected by a passage means, as shown in Fig. 13, with a passageway 161, while the passage 139 is connected by passage means, as shown in Fig. 15, with a passage 162, the purpose and function of passageways 161 and 162 will be described more particularly hereinafter. The spool valve 150 is also formed with a central through bore 163, which communicates with the annular groove 155 through a diametral passage 164, and with passage 168. In this manner, the spool valve 150 is hydraulically balanced.

With particular reference to Figs. 9, 10 and 17, the snap acting mechanism for shifting the spool valve 150 will be described. The snap acting shifting mechanism for the spool valve 150 comprises a spring toggle, generally designated by the numeral 170 in Figs. 10 and 17. The spring toggle comprises a pair of nested, U-shaped lever members 171 and 172, which are pivotally interconnected by pins 173 and 174. In addition, the bridge portions of the U-shaped levers 171 and 172 are interconnected by a coil spring 175. One leg of the U-shaped lever 172 is formed with a downwardly extending bifurcated portion 176, which snugly engages opposite surfaces of the land 153 on the valve spool 150. In addition, one leg of the U-shaped lever 171 is formed with a pair of cam surfaces 177 and 178, which abut the ends of a pair of reaction pistons 179 and 180, respectively. The reaction pistons 179 and 180 are slidably supported in servo cylinders 181 and 182, respectively. Servo cylinder 182 communicates with passage 162, while servo chamber 181 communicates with passage 161. The spring toggle operates in a conventional manner in that as soon as one of the reaction pistons moves the lever 171 to an over center position, the spring 175 will immediately effect snap action of the toggle 170 to its other extreme position, thereby effecting snap action of the spool valve 150.

Operation of the preferred control valve embodiment is as follows. When the rotary valve 118 is moved to an "on" position, wherein the passage arcuate groove 137 is connected with the passage 139, pressure fluid admitted through passage 129 to the supply port 159 of the spool valve 150 will be supplied through the bore 163 to the right-hand end of the spool valve 150 from whence it will be passed through port 158 to the motor controlling port 115. This same pressure potential will be supplied through passage 142 and annular groove 141, slot 140, arcuate groove 137, passage 139 and passage 162 to the servo chamber 182. Thus, both motors will move in synchronism and when the motor pistons approach the ends of their normal wiping stroke, the pressure will build up in the servo chamber 182 so as to effect upward movement of the reaction piston 180 and the lever 171. When the centerline of the spring 175 is moved below the center of pivot point 174, the lever 172 will snap to its extreme downward position, as viewed in Fig. 10, thereby effecting snap movement of the reversing valve 150 to the left, as viewed in Fig. 10, to the right, as viewed in Fig. 9. It will be appreciated that when one of the reaction pistons is exposed to the pressure applied to one side of the motors, the other reaction piston is connected to drain. In this manner, the motor piston will be maintained in a state of continuous reciprocation during operation of the windshield wiper actuating mechanism. Speed control is afforded by the diametrical passage 128 in the reduced annular portion 127 of the valve 118.

When it is desired to interrupt operation of the windshield wipers, the valve 118 is moved to the position depicted in Figs. 9 and 11 through 16 wherein the passage 139 communicates with the slot 138. Thus, the passage 162 is disconnected from the annular groove 141 whereupon pressure fluid will not be supplied to the servo chamber 182. Accordingly, the reaction piston 180 will be unable to effect over center movement of the toggle mechanism 170, and, consequently, the strokes of the motor pistons will be extended so as to move the blades to a "parked" position. The blades will remain in the "parked" position, as will the motor pistons, since pressure fluid is continuously supplied to one side of the motor pistons. Furthermore, when wiper operation is resumed, rotation of the valve 118 will immediately subject the servo cylinder 182 to pressure, thereby actuating the toggle mechanism so as to reverse the position of the spool valve 150.

With particular reference to Fig. 3, the pressure build up, which effects operation of the reaction pistons is caused by the closure of either calibrated orifice 33 or 34. Thus, as the piston 24 approaches the ends of its normal stroke, the piston will close orifices 33 and 34. Accordingly, the resistance to movement of the piston is increased since the ball check valves 35 or 36 will tend to retard piston movement. In this manner, the pressure in the opposite chamber will build up, thereby actuating one or the other of the reaction pistons so as to reverse the position of the spool valve in either control valve unit.

From the foregoing, it is manifest that the present invention comprehends unique means for effecting synchronous operation of a plurality of fluid motors. Furthermore, by reason of the incorporation of an independent motor for each cleaner assembly, the stalling of one cleaner assembly due to a windshield obstruction will in no way affect the operation of the other cleaner assembly.

While the embodiments of the present invention as herein disclosed, constitute preferred forms, it is to be understood that other forms might be adopted.

What is claimed is as follows:

1. In combination, a fluid motor having a cylinder, a movable member disposed in said cylinder, said movable member being capable of fluid pressure actuation in both directions, reversing means for controlling the application of pressure fluid to opposite sides of said movable member so as to maintain said member in a state of continuous movement throughout a running stroke, said reversing means including a reciprocable valve, snap acting mechanism for effecting reciprocable movement of said valve and a pair of oppositely acting reaction pistons responsive to the pressure increase on opposite sides of said movable motor member as said movable member approaches the ends of its running stroke for controlling the operation of said snap acting mechanism, and means operable to interrupt the connection between one reaction piston and the cylinder on one side of said movable motor member to increase the stroke of said motor member and interrupt movement thereof.

2. In combination, a fluid motor having a cylinder, a movable member disposed in said cylinder, said movable member being capable of fluid pressure actuation in both directions, reversing means for controlling the application of pressure fluid to opposite sides of said movable member so as to maintain said member in a state of continuous movement throughout a running stroke, said reversing means including a valve, a spring toggle for effecting movement of said valve between predetermined limit positions and a pair of oppositely acting reaction pistons operatively associated with said spring toggle and responsive to the pressure increase on opposite sides of said movable motor member as said movable member approaches the ends of its running stroke for controlling the operation of said spring toggle and means operable to interrupt the connection between one reaction piston and the cylinder on one side of said movable member for increasing the stroke of said movable member and interrupting movement thereof.

3. In combination, a fluid motor having a cylinder, a movable member disposed in said cylinder, said movable member being capable of fluid pressure actuation in both directions, reversing means for controlling the application of pressure fluid to opposite sides of said movable member so as to maintain said member in a state of continuous movement throughout a running stroke, said reversing means including a valve, at least one toggle spring for effecting movement of said valve between predetermined limit positions and a pair of oppositely acting reaction pistons operatively associated with said toggle spring and responsive to the pressure increase on opposite sides of said movable motor member as said movable member approaches the ends of its running stroke for controlling the operation of said toggle spring, and means operable to interrupt the connection between one reaction piston and the cylinder on one side of said movable member for increasing the stroke of said movable member and interrupting movement thereof.

4. In combination, a fluid motor having a cylinder, a movable member disposed in said cylinder, said movable member being capable of fluid pressure actuation in both directions, reversing menas for controlling the application of pressure fluid to opposite sides of said movable member so as to maintain said member in a state of continuous movement throughout a running stroke, said reversing means including a spool valve, a spring toggle including a pair of pivotally interconnected levers and an over center spring, one of said levers being operatively connected with said spool valve and a pair of oppositely acting reaction pistons engageable with one of said levers and responsive to the pressure increase on opposite sides of said movable motor member as said movable member approaches the ends of its running stroke for effecting over center movement of said toggle spring so as to effect intermittent movement of said spool valve, and means operable to interrupt the connection between one reaction piston and the cylinder on one side of said movable member for increasing the stroke of said movable member and interrupting movement thereof.

5. In combination, a fluid motor having a cylinder, a movable member disposed in said cylinder, said movable member being capable of fluid pressure actuation in both directions, reversing means for controlling the application of pressure fluid to opposite sides of said movable member so as to maintain said member in a state of continuous movement throughout a running stroke, said reversing means including a valve, a spring toggle operatively including a pair of pivotally interconnected levers and an over center spring, one of said levers being operatively interconnected with said valve for effecting snap movement thereof between predetermined limit positions and a pair of oppositely acting reaction pistons engageable with the other of said levers and responsive to the pressure increase on opposite sides of said movable motor member as said movable member approaches the ends of its movement for effecting over center movement of said spring so as to cause intermittent snap movement of said valve, and manually operable means to interrupt the connection between one reaction piston and the cylinder on one side of said movable motor member for increasing the stroke of said motor member and interrupting the movement thereof.

6. In combination, a fluid motor having a cylinder, a movable member disposed in said cylinder, said movable member being capable of fluid pressure actuation in both directions, reversing means for controlling the application of pressure fluid to opposite sides of said movable member so as to maintain said member in a state of continuous movement throughout a running stroke, said reversing means including a spool valve, a pair of toggle springs operatively connected with said spool valve for effecting snap movement thereof between predetermined limit positions, and a pair of oppositely acting reaction pistons operatively associated with said spool valve and responsive to the pressure increase on opposite sides of said movable motor member as said movable member approaches the ends of its movement for alternately stressing said toggle springs so as to effect intermittent snap movement of said spool valve, and means operable to interrupt the connection between one reaction piston and the cylinder on one side of said movable member for increasing the stroke of said movable member and interrupting movement thereof.

7. In combination, a fluid motor having a cylinder, a movable member disposed in said cylinder, said movable member being capable of fluid pressure actuation in both directions, reversing means for controlling the application of pressure fluid to opposite sides of said movable member so as to maintain said member in a state of continuous movement throughout a running stroke, said reversing means including a valve, a pair of toggle springs operatively connected with said valve for effecting snap movement thereof between predetermined limit positions, and means for alternately stretching said toggle springs in opposite directions so as to effect intermittent snap movement of said valve including a pair of oppositely acting reaction pistons responsive to the pressure increase on opposite sides of said movable motor member as said movable member approaches the ends of its movement, and resilient means operatively interconnecting said reaction pistons and said valve for transmitting the thrust of said reaction pistons to said toggle springs, and means operable to interrupt the connection between one reaction piston and the cylinder on one side of said movable member for increasing the stroke of said movable member and interrupting movement thereof.

8. In combination, a fluid motor having a cylinder, a movable member disposed in said cylinder, said movable member being capable of fluid pressure actuation in both directions, reversing means for controlling the application of pressure fluid to opposite sides of said movable member so as to maintain said member in a state of continuous movement throughout a running stroke, said reversing means including a valve, snap acting mechanism for effecting movement of said valve between predetermined limit positions, and a pair of oppositely acting reaction pistons responsive to the pressure increase on opposite sides of said movable motor member as said movable member approaches the ends of its movement for controlling the operation of said snap acting mechanism, and a manually positionable valve for throttling the application of pressure fluid to said reversing means so as to control the speed of movement of said motor member, said manually positionable valve also being operable to interrupt the connection between one of said reaction pistons and the cylinder on one side of said movable member for increasing the stroke of said movable member and interrupting movement thereof.

9. In combination, a fluid motor having a cylinder, a movable member disposed in said cylinder, said movable member being capable of fluid pressure actuation in both directions, reversing means for controlling the application of pressure fluid to opposite sides of said movable member so as to maintain said member in a state of continuous movement throughout a running stroke, said reversing means including a valve, snap acting mechanism for effecting movement of said valve between predetermined limit positions, and motor pressure reaction means for controlling said snap acting mechanism, a manually positionable valve including means for throttling the application of pressure fluid to said reversing means so as to control the speed of movement of said motor member, and means for interrupting the connection between one of said motor pressure reaction means and one side of said movable motor member so as to disable said reversing means whereby said movable motor member will be moved to a parked position beyond the running stroke.

10. In combination, a fluid motor having a cylinder, a movable member disposed in said cylinder, said movable member being capable of fluid pressure actuation in both directions, reversing means for controlling the application of pressure fluid to opposite sides of said movable member so as to maintain said member in a state of continuous movement throughout a running stroke, said reversing means including a reversing valve movable between predetermined limit positions, snap acting mechanism operatively associated with said reversing valve, and a pair of oppositely acting reaction pistons responsive to the pressure increase on opposite sides of said movable motor member as said movable member approaches the ends of its movement for controlling the operation of said snap acting mechanism, and a manually positionable rotary valve including throttling means for controlling the application of pressure fluid to said reversing valve so as to control motor speed, said rotary valve also being operable to interrupt the connection between one of said reaction pistons and the cylinder on one side of said movable motor member to extend the stroke of said motor member and interrupt movement thereof.

11. In combination, a fluid motor having a cylinder, a movable member disposed in said cylinder, said movable member being capable of fluid pressure actuation in both directions, reversing means for controlling the application of pressure fluid to opposite sides of said movable member so as to maintain said member in a state of continuous movement throughout a running stroke, said reversing means including a reversing valve movable between predetermined limit positions, snap acting mechanism operatively associated with said reversing valve, and a pair of oppositely acting reaction pistons responsive to the pressure increase on opposite sides of said movable motor member as said movable member approaches the ends of its movement for controlling the operation of said snap acting mechanism, and a manually positionable rotary valve including means for interrupting the connection between one of said reaction pistons and one side of said motor member so as to disable said snap acting mechanism whereby said motor member will move to a parked position beyond its normal running stroke.

12. In combination, a fluid motor having a cylinder, a reciprocable piston disposed in said cylinder capable of fluid pressure actuation in both directions and dividing the cylinder into two chambers, conduit means connected to both of said cylinder chambers adjacent the ends thereof, the connection between each motor chamber and each conduit means including a check valved passage bypassed by a calibrated orifice, the construction and arrangement being such that the calibrated bypass orifice is closed by the piston adjacent each end of its running stroke whereby the pressure in the opposite motor chamber will increase, reversing valve means for controlling the application of pressure fluid to opposite chambers of said cylinder to maintain said piston in a state of continuous movement throughout its running stroke, said reversing valve means including a valve and a pair of fluid pressure responsive reaction members, each reaction member having connection with and being responsive to the pressure increase in one of said motor chambers for shifting said valve adjacent the ends of the running stroke of said piston, and means for interrupting the connection between one of said reaction members and its respective cylinder chamber so as to extend the stroke of said piston and interrupt movement thereof.

13. The combination set forth in claim 12 including snap-acting mechanism operatively connected with said reaction members for effecting movement of said valve.

14. A reversing valve for controlling the pressure and drain connections of a pair of control ports including a valve body having a pressure inlet port, a drain port and a pair of control ports, a reciprocable valve member disposed within said body having two limit positions wherein the pressure and drain connections of said control ports are reversed, a spring toggle assembly for effecting snap action movement of said valve member between its limit positions including a pair of pivotally interconnected levers and an over center spring interconnecting said levers, one of said levers being operatively connected with said valve member, and a pair of reaction pistons engageable with opposite ends of the other lever, each piston being connected with and responsive to a predetermined pressure at one of said control ports for actuating said other lever to effect over center movement of said spring and movement of said valve member in opposite directions.

15. A reversing valve for controlling the pressure and drain connections of a pair of control ports including, a valve body having a pressure inlet port, a drain port and a pair of control ports, a reciprocable valve member disposed within said body having two limit positions wherein the pressure and drain connections of said control port are reversed, a spring toggle assembly for effecting snap action movement of said valve member between its limit positions including a pair of nested U-shaped levers, means pivotally interconnecting said levers and an over center spring interconnecting the base portions of said U-shaped levers, one of said levers being operatively connected with said valve member, and a pair of reaction pistons engageable with opposite ends of the other lever, each piston being connected with and responsive to a predetermined pressure at one of said control ports for actuating said other lever to effect over center movement of said spring and movement of said valve member in opposite directions.

16. A reversing valve for controlling the pressure and drain connections of a pair of control ports including, a valve body having a pressure inlet port, a drain port and a pair of control ports, a reciprocable spool valve disposed within said body having two limit positions wherein the pressure and drain connections of said control ports are reversed, said spool valve having a plurality of spaced lands, a spring toggle assembly for effecting snap action movement of said spool valve between its limit positions including a pair of pivotally interconnected levers and an over center spring interconnecting said levers, one of said levers having a bifurcated portion connected with one of the lands on said spool valve, and a pair of reaction pistons engageable with opposite ends of the other lever, each piston being connected with and responsive to a predetermined pressure at one of said control ports for actuating said other lever to effect over center movement of said spring and movement of said spool valve in opposite directions.

References Cited in the file of this patent

UNITED STATES PATENTS

| | | |
|---|---|---|
| 840,877 | Steedman | Jan. 8, 1907 |
| 885,459 | Engler et al. | Apr. 21, 1908 |
| 1,019,074 | Newhouse | Mar. 5, 1912 |
| 2,298,457 | Berges | Oct. 13, 1942 |
| 2,302,232 | MacNeil | Nov. 17, 1942 |
| 2,378,320 | O'Shei | June 12, 1945 |
| 2,547,175 | Sacchini | Apr. 3, 1951 |
| 2,609,795 | Freeman et al. | Sept. 9, 1952 |
| 2,698,517 | Witt | Jan. 4, 1955 |

FOREIGN PATENTS

| | | |
|---|---|---|
| 511,312 | Canada | Mar. 22, 1955 |